United States Patent [19]

Chandrashekhar et al.

[11] Patent Number: 4,623,906

[45] Date of Patent: Nov. 18, 1986

[54] STABLE SURFACE COATING FOR INK JET NOZZLES

[75] Inventors: G. V. Chandrashekhar, Mahopac; Merrill W. Shafer, Peekskill, both of N.Y.

[73] Assignee: International Business Machines Corporation, Armonk, N.Y.

[21] Appl. No.: 793,378

[22] Filed: Oct. 31, 1985

[51] Int. Cl.⁴ .......................................... G01D 15/18
[52] U.S. Cl. ................................... 346/140 R; 346/75; 239/DIG. 19
[58] Field of Search ................................ 346/140, 75; 239/DIG. 19

[56] References Cited

U.S. PATENT DOCUMENTS

| | | | |
|---|---|---|---|
| 4,007,464 | 2/1977 | Bassous | 346/140 R X |
| 4,047,184 | 9/1977 | Bassous | 346/140 R X |
| 4,368,476 | 1/1983 | Uehara | 346/140 |
| 4,389,654 | 6/1983 | Bar-on | 346/75 |

OTHER PUBLICATIONS

Tu et al; Ink Jet Silicon Nozzles Coated with Ion-Implanted Silicide for Corrosion Protection; IBM TDB vol. 21, No. 8, Jan. 1979, p. 3371.

*Primary Examiner*—Joseph W. Hartary
*Attorney, Agent, or Firm*—Jackson E. Stanland

[57] ABSTRACT

An improved glass or silicon ink jet nozzle is described having a three-layer coating that provides improved mechanical and chemical properties. The coating includes a first layer of silicon nitride, an intermediate layer graded in composition, and a top-most layer of aluminum nitride. The intermediate layer is typically a solid solution of silicon and aluminum nitrides being silicon-rich at the interface with the silicon nitride layer, and aluminum-rich at the interface with the overlying aluminum nitride layer. This three-layer coating provides the required dielectric properties, displays very low wettability, and is extremely corrosion resistant to all types of inks.

11 Claims, 2 Drawing Figures

STABLE SURFACE COATING FOR INK JET NOZZLES

DESCRIPTION

1. Field of the Invention

This invention relates to improved silicon or glass nozzles for ink jet printers, and more particularly to silicon or glass nozzles having a multilayer coating thereon for enhanced wear properties and chemical stability, as well as very low wettability.

2. Background Art

Ink jet printing is well known as a technique for providing nonimpact printing of a high quality in applications such as computer output terminals. In ink jet printing, a sequence of individual ink droplets strikes the record member (paper) to produce a desired pattern thereon. In some printers, single ink nozzles are utilized which pass the record medium at high speed while continually emitting a stream of ink that breaks up into ink droplets. Single nozzle arrangements of this type have been proposed for "drop-on-demand" systems wherein ink droplets are generated only when the nozzle approaches a specific portion of the recording member. Other ink jet systems, termed continuous systems, have been proposed wherein a single nozzle continuously generates ink droplets that are either directed to a specific recording medium pixel, or guttered to a recirculating system for reuse.

In addition to the single ink droplet nozzle, the technology has utilized an array or plurality of ink droplet nozzles spaced across a record medium for generating a number of streams of ink recording droplets. For example, stationary nozzles can be arranged where each of the nozzles directs a droplet stream toward the record member along an initial path parallel to the plurality of ink jet trajectories. Subsequent to the production of the droplets, droplet charging and deflecting mechanisms downstream from the droplet generator interact with the droplets, changing their trajectories and thereby directing the droplets to desired portions on the recording member. In these systems, the ink droplets must be properly charged so that they can be deflected in a proper manner to the desired location. A typical ink jet system includes a device for exciting or perturbing the ink as it is squirted from the nozzle, in order to induce droplet production which is in appropriate relation to a charging electrode.

Many different nozzles and nozzle arrays have been proposed for use, including many different materials. Common materials include semiconductors such as silicon, glass, and metals. In particular, silicon nozzle arrays appear to be the most advantageous, since semiconductor processing techniques can be used to uniformly etch a series of nozzle openings in a single crystal silicon wafer. This type of technique, and others, is described by E. Bassous and A. L. Kuhn in U.S. Pat. No. 4,047,184. Another patent by these inventors, and others, is U.S. Pat. No. 4,007,464, which describes preferred shapes for the entrance and exit orifices of the nozzle.

Fabrication of the nozzle, and its properties, is extremely critical to the provision of high quality, high speed printing using ink jets. In particular, it is known in this art that the nozzle should have very low wettability for inks in order that the inks not dry and become coated in or around the nozzle openings. It is also known that the nozzles should have good wear-resistance and be chemically inert, so as to avoid corrosion by aqueous and non-aqueous inks. Still further, the nozzles should have good hardness and mechanical strength, so as to be durable.

In order to provide mechanical strength, wear resistance, and low wettability, various materials have been proposed as coatings on nozzles. These coatings include $SiO_2$, polymers such as Teflon (a trademark of E. I. DuPont deNemours), and $Si_3N_4$. These coatings have been described in the aforementioned U.S. patents. Additionally, U.S. Pat. No. 4,389,654 describes a metal nozzle having a coating of gold or nickel thereon to protect against corrosive attack by ink.

In all of the above-cited examples the coatings, although advantageous, do not provide all of the features which must be provided by a superior coating. For example, oxides such as $SiO_2$ have high wettability and change their surface porosity during use. Polymers such as Teflon exhibit very low wettability for inks, but also exhibit poor wear resistance. Additionally, some polymers can pick up moisture and otherwise degrade in their chemical and mechanical properties. Silicon nitride ($Si_3N_4$) has primarily been used as a dielectric but does not exhibit as high a contact angle for aqueous and nonaqueous inks as is desired. This relatively low contact angle means that silicon nitride films can be wetted by aqueous and nonaqueous inks. Further, as newer inks are developed having acidic or basic properties, and using various additives such as colorant dyes and surface activation additives, the requirements for the nozzle coatings are likely to increase and the heretofore mentioned coatings may exhibit additional disadvantages and limitations.

Accordingly, it is a primary object of the present invention to provide improved coatings for glass and silicon ink jet nozzles, where the coatings exhibit excellent mechanical properties, are chemically inert, and exhibit low wettability for both aqueous and nonaqueous inks.

It is another object of the present invention to provide improved silicon and glass ink jet nozzles which have enhanced wear resistance, are stable, and which are easily fabricated using well known techniques.

It is another object of this invention to provide improved coatings for silicon and glass ink jet nozzles, where the coatings are easily fabricated in layers of uniform thickness, exhibit good adhesion to either glass or silicon, and have very low wettability for both aqueous and nonaqueous inks.

It is another object of the present invention to provide improved coatings for silicon and glass nozzles which exhibit good wear resistance and are chemically inert, offering very good corrosion resistance to all types of inks.

It is another object of the present invention to provide improved glass and silicon ink jet nozzles using multilayer coatings thereon having good electrical and mechanical properties, good chemical stability, and low wettability to inks.

DISCLOSURE OF THE INVENTION

In the practice of this invention, improved glass and silicon ink jet nozzles are produced, having a multilayer coating thereon that provides all of the advantages hereinabove listed. This multilayer coating includes a first layer of silicon nitride deposited on the silicon or glass nozzle, a top-most layer of aluminum nitride (AlN), and an intermediate layer located between the silicon nitride and the aluminum nitride layers, where the intermediate layer is a graded layer of mixed nitrides. This intermediate layer is silicon-rich at the interface of the intermediate layer and the silicon nitride layer, and aluminum-rich at the interface between the intermediate layer and the overlying aluminum nitride layer. Thus, the intermediate layer is primarily silicon nitride when first deposited and aluminum nitride at its top surface.

The underlying silicon nitride layer provides excellent adhesion to the glass or silicon nozzles and good electrical properties in terms of its dielectric constant. The intermediate layer provides excellent adhesion between the overlying aluminum nitride layer and the silicon or glass nozzle, and its graded composition eliminates any thermal expansion differences between the AlN layer and the silicon or glass nozzle. The AlN layer has excellent hardness and exhibits a low degree of wettability to inks. It is superior to $Si_3N_4$ in this regard, and does not change its wettability characteristics after extended ink-soaking tests. Also, it is very chemically inert and has good stability and resistance to corrosion when exposed to all types of inks. It is mechanically hard and of good strength, and can be easily provided as a uniformly thick layer by a plurality of well known techniques.

In the practice of this invention, it has been found that a multilayer coating must be used in order to ensure that good adhesion and all of the mechanical, chemical, and electrical properties required for successful nozzle operation are present. These properties cannot be achieved by the use of any presently known single layer.

These and further objects, features, and advantages will be apparent from the following more particular description of the preferred embodiments.

BEST MODE FOR CARRYING OUT THE INVENTION

Figure 1:
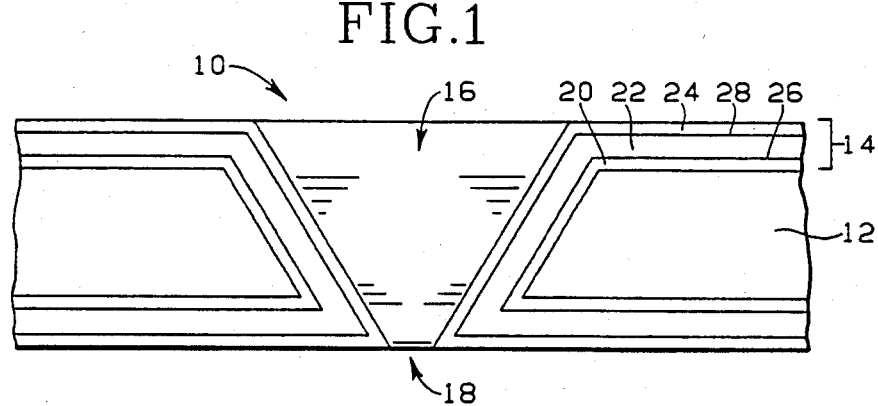
FIG. 1 is a view of a single nozzle opening which may be, for instance, part of an array of similar such nozzles, having the inventive three-layer coating thereon.

In FIG. 1, a single ink jet nozzle 10 is illustrated, although will be understood by those of skill in the art that this nozzle can be one of many in an array of such nozzles. Nozzle 10 is comprised of either silicon or glass 12 having a three-layer coating 14 thereon. Openings 16 and 18 can be used for the entrance and exit apertures of the nozzle 10, the direction of ink flow through these openings being reversible as is known in the art.

Coating 14 is comprised of a first layer 20, an intermediate layer 22, and a top layer 24. Layer 20 is comprised of silicon nitride $Si_3N_4$, which is typically an amorphous nitride formed on the glass or silicon layer 12. In the fabrication of these nozzles, it may be that a small layer of silicon oxide is present on layer 12 prior to the formation of silicon nitride layer 20. The presence of this oxide does not interfere with the adhesion of or affect the coating 14. Intermediate layer 22 is a mixed nitride of silicon and aluminum, while the outermost layer 24 is AlN.

In practice, the thickness of the three layers 20, 22, and 24 are not critical, the thicknesses being chosen with respect to design requirements such as dielectric strength, the provision of continuous, pinhole-free films, and thermal matching so as to avoid stresses. As a representative embodiment when the layers 20, 22, and 24 are formed by chemical vapor deposition (CVD), the thicknesses of layers 20, 22, and 24 are about 1000 angstroms, 1000–5000 angstroms, and 1000 angstroms, respectively. When using CVD, the preferred thickness of the intermediate layer 22 is about 2000 angstroms.

As noted previously, intermediate layer 22 provides a good thermal match between the underlying silicon or glass nozzle and the overlying AlN layer. Layer 22 is comprised of a mix of silicon nitride and aluminum nitride, with this layer being silicon-rich at interface 26, and aluminum-rich at interface 28. Thus, layer 22 blends the silicon nitride composition 20 to the aluminum nitride composition 24 by decreasing the amount of silicon as the thickness of layer 22 increases, while at the same time increasing the amount of aluminum.

Figure 2:
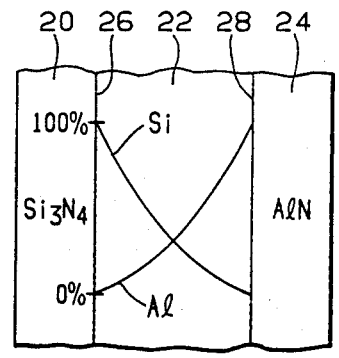
FIG. 2 schematically illustrates the composition of the three layers in the coating, and particularly illustrates the graded composition of the intermediate layer.

FIG. 2 is a cross-section of the three-level coating 14, illustrating the change in composition of the intermediate layer 22 with thickness from the silicon nitride layer 20 to the AlN layer 24. At interface 26 between layers 20 and 22, there is 100% Si, no Al. However, the amount of Si decreases to 0% at interface 28 between layers 22 and 24 while, in the same distance, the percentage of Al increases from 0% to 100% at interface 28. Thereafter, layer 24 is substantially pure AlN.

Layer 22, having mixed composition, can be solid solutions of silicon nitride and aluminum nitride, produced by a variety of known techniques. These techniques include sputtering, CVD, and evaporation. Multiple sources can be used to form the intermediate layer 22, while single sources are used to form the silicon nitride layer 20 and the aluminum nitride layer 24.

As an example, CVD can be used to form the three layers in coating 14. To form $Si_3N_4$ layer 20, a mixture of silane $SiH_4$ and ammonia ($NH_3$), together with an inert carrier gas, is passed over a hot substrate comprising silicon or glass layer 12. The reaction parameters for the deposition of silicon nitride by this technique are well known in the art and will not be described in detail herein. After the required thickness of silicon nitride has been formed, the gas stream can be changed to introduce another gas. For example, the amount of silane can be reduced to reduce the amount of silicon in intermediate layer 22, while a source gas for Al can be introduced and increased in amount to provide an increasing amount of Al in layer 22. A suitable gas for this is trimethyl aluminum $Al(CH_4)_3$ aluminum and bromine or aluminum and chlorine such as $AlBr_3$ or $AlCl_3$, together with $NH_3$. Typical substrate temperatures are 700°–800° C. After this, the silane gas source is completely shut off, and only AlN is deposited to form layer 24.

The thickness of layer 22 is such as to provide compositional grading between layers 20 and 24 in a manner to have minimal thermally induced stress. Compositional mixing of silicon and aluminum achieves this. This type of mixing can be achieved rapidly by a technique such as dual beam sputtering, wherein sources of silicon and aluminum are separately sputtered onto the substrate including layers 12 and 20. If dual beam sputtering is used, a layer 22 of 500 angstroms thickness or less, is suitable to provide the necessary matching and compositional grading. A reference generally describing dual ion beam techniques is J. M. E. Harper et al, Appl. Phys. Lett. 43, (6) p. 547, Sept. 15, 1983. In particular, this reference describes the formation of AlN by dual ion beam deposition.

As an example, $Si_3N_4$ can be deposited on either silicon or quartz glass nozzles using a target of silicon and an atmosphere comprising argon and nitrogen. The argon can be present in a pressure of 24 mTorr while the nitrogen is present at a pressure of 6 mTorr. The cathode can be held at approximately 400-500 volts (1000 volts peak) negative bias, while the anode can be held at about −50 volts dc. The target to substrate distance is about 3.25 inches. Silicon nitride will be deposited at a rate of about 300 angstroms/minute onto the silicon or glass substrate, which is water-cooled to room temperature.

The intermediate layer 22 can be formed in the same deposition apparatus by introducing and sputtering from an Al target. The same type of gaseous environment can be utilized with approximately the same gas pressures. However, the cathode voltage and/or the anode voltage will be changed to increase sputtering from the aluminum target while decreasing sputtering from the silicon target. This will produce the graded composition of silicon and aluminum in intermediate layer 22.

A pure AlN layer 24 can also be formed in this dual beam sputtering apparatus. This is accomplished by the presence of an argon and nitrogen atmosphere in which the argon pressure and nitrogen pressure are approximately 20 mTorr. A dc cathode voltage of about 130 volts (350 volts peak) is applied, while the anode voltage is maintained at −50 volts dc. A deposition rate of approximately 25 angstroms/minute onto the intermediate layer 22 is provided, where the substrate temperature is about 200° C.

Soak tests were performed to evaluate the corrosion resistance of the AlN layer 24. In these tests, various inks were placed in contact with layer 24 and the contact angle of the liquid to the layer 24 was measured. These measurements were taken at selected intervals to see whether the liquid drops would spread. In one type of test, a drop of ink was placed on the AlN test surface and the contact angle was measured. The ink was then allowed to dry, after which it was washed from the surface under a stream of the ionized water. It was then checked to see if water tended to preferentially wet the surface in those areas where the ink drop had been soaking.

In another test, the AlN surface was immersed in inks for many hours, either at room temperature or at an elevated temperature (65° C.). After the soak period, the surface was thoroughly cleaned, dried and vacuumed at about 65° C., and the contact angle measured. This was repeated after each soak treatment, the surfaces being examined under a scanning electron microscope to check for possible corrosion. In these tests, the AlN layer did not exhibit any change in the measured contact angles before and after the soak treatment, indicating the excellent chemical stability of these surfaces toward various inks. Further, the scanning electron microscope photographs did not indicate any significant differences in the surfaces before and after testing, indicating that the films were extremely corrosion-resistant.

Adhesion of these layers to the underlying silicon or glass nozzles is excellent. In contrast with organic materials which have a large difference in thermal expansion coefficients compared to silicon, the nitrides of this invention have more comparable coefficients of thermal expansion. This, coupled with the graded composition layer 22, provides excellent adhesion and low stress in the deposited layers. Also, the silicon nitride layer 20 can be used as a dielectric layer in a nozzle array of the type known in the art, wherein such a dielectric is used between current carrying conductors.

In the practice of this invention, a three-layer coating for silicon or glass ink jet nozzles has been described which has superior mechanical and chemical properties regardless of the types of inks which are used. Further, the stability and endurance of this coating exceeds that of presently known coatings.

While the invention has been described with respect to particular embodiments thereof, it will be appreciated by those of skill in the art that variations can be made therein without departing from the spirit and scope of the present invention. For example, the exact composition of the intermediate layer 22 and the thicknesses of the various layers can be varied depending upon the design requiements of the nozzle. Still further, it will be understood that impurities can be introduced in the different layers in order to modify their properties somewhat.

Having thus described our invention, what we claim as new and desire to secure by Letters Patent is:

1. An ink jet nozzle for ink jet printing, comprising:
   a layer of silicon or glass having an opening for said nozzle therein,
   a multi-level coating on said nozzle comprised of a first layer of silicon nitride on said silicon or glass layer, an intermediate layer comprised of a mixture of silicon nitride and aluminum nitride, and a third layer comprised of aluminum nitride.

2. The ink jet nozzle of claim 1, where said intermediate layer is a graded composition, being silicon-rich near its interface with said first layer and aluminum-rich near its interface with said first layer.

3. The ink jet nozzle of claim 2, where said first layer is about 1000 angstroms thick and said third layer is about 1000 angstroms thick.

4. The ink jet nozzle of claim 3, where said second layer has a thickness in the range of about 500-5000 angstroms.

5. The ink jet nozzle of claim 2, where said first and third layers are comprised of amorphous material.

6. An ink jet nozzle including a layer of silicon or glass having at least one aperture therethrough defining said nozzle, said nozzle including a first layer of silicon nitride in contact with said silicon or glass, a second layer of silicon nitride and aluminum nitride in contact with said first layer, said second layer having a graded composition across its thickness, wherein the percentage of silicon in said second layer decreases in a direction normal to said second layer as measured from the interface of said second layer and said first layer and further wherein the percentage of aluminum in said second layer increases in a direction normal to the interface of said second layer and said first layer, and a third layer of aluminum nitride in contact with said second layer.

7. The nozzle of claim 6, where said first, second and third layers are substantially amorphous.

8. The nozzle of claim 6, where said second layer is comprised of solid solutions of silicon nitride and aluminum nitride.

9. The nozzle of claim 6, where the compositional grading in said second layer provides a good thermal match between said third layer and said silicon or glass layer.

10. The nozzle of claim 9, where said second layer has a thickness in the range of about 500-5000 angstroms.

11. The nozzle of claim 10, where said first layer and said third layer are substantially continuous layers.

* * * * *